United States Patent [19]

Hurlock

[11] Patent Number: 4,890,879
[45] Date of Patent: Jan. 2, 1990

[54] CAMPER SHELL

[76] Inventor: Arthur C. Hurlock, 3020 E. Main, E-8, Mesa, Ariz. 85213

[21] Appl. No.: 336,117

[22] Filed: Apr. 11, 1989

[51] Int. Cl.⁴ .............................................. B62D 35/00
[52] U.S. Cl. ................................. 296/180.2; 296/156; 296/26; 296/216
[58] Field of Search .................. 296/180.2, 180.3, 156, 296/216

[56] References Cited

U.S. PATENT DOCUMENTS

| | | | |
|---|---|---|---|
| 3,768,854 | 10/1973 | Johnson et al. | 296/180.3 |
| 4,397,496 | 8/1983 | Drygas | 296/180.2 |
| 4,462,628 | 7/1984 | Gregg | 296/180.3 |
| 4,779,915 | 10/1988 | Straight | 296/180.3 |

Primary Examiner—Robert R. Song
Attorney, Agent, or Firm—Charles E. Cates

[57] ABSTRACT

A camper shell for use on a pick up truck towing a mobile living unit such that the lower forward end registers with the top of the truck and the back end registers with the mobile unit's roof to streamline air flow. The shell may optionally have upper and lower telescoping parts that are telescoped for travel and when at rest the shell is raised to provide a habitation.

5 Claims, 1 Drawing Sheet

CAMPER SHELL

BACKGROUND OF THE INVENTION

This invention relates to improvements in pick up truck camper shells.

Camper shells are known to the prior art wherein the shell is specially constructed to fit the bed of a pick up truck for the purpose of providing temporary habitation and storage, as for example, on a camping trip.

BRIEF DESCRIPTION OF THE INVENTION

I have devised an improved shell with a configuration for streamlining the flow of air over a recreational vehicle or mobile living unit towed by the pick up truck upon which the camper shell is mounted.

The invention optionally may provide for a convertible means for use both as a camper shell, particularly when at rest in a temporary location, and as a means for streamlining the flow of air from a pick up truck over a mobile living unit being towed by the pick up truck. The apparatus has top and bottom portions and first and second ends. The top portion of the shell has first and second end walls, sides and a roof connecting first and second ends. The roof surface registers substantially with the top of the cab of the truck at the first end and substantially with the top of the living unit at the second end. The bottom half includes sides and a second end wall that cooperates with the second end wall of the top half and the truck tailgate to form means for ingress and egress to the shell's interior; and means for attaching the shell to the bed of the pick up truck. The top and bottom parts of the shell are interacting and are adapted to move between first and second operating positions. The first operating position is defined by the structural relationship already described and the second operating position is defined by expanding the top portion to provide a camper shell habitation. The top and bottom parts of the shell are hinged at their second ends so that the top part may be telescoped in the first position and the top portion may be raised at the first end to the second operation position to create additional head room. The bottom portion's walls are adapted to fit the dimensions of the truck bed on which the shell is to be carried. The top half which has two side walls and a roof, and is hinged to the bottom half at the second end, pivots on the hinge from a first downward operating position to a second upward operating position. In the downward position the roof forms an inclined plane where the first end registers approximately with the top of the cab of the truck and the second end registers approximately with the plane of the roof of the mobile living unit being towed. In an alternative embodiment the end wall at the second end of the shell is attached to the bottom half and has a conventional door. The top half slides past the end wall and is sealed by a gasket.

There are various hinge and latch means associated with the top and bottom halves that are adapted to raising and lowering and securing the top half in the first and second operating positions, which hinge and latch means are known in the art and are not, therefore, discussed in detail. Also, as known in the art, windows and doors as desired may be added, and any known means for attaching the shell to the truck may be employed.

BRIEF DESCRIPTION OF THE DRAWINGS

Turning now to the drawings in which the presently preferred embodiments of the invention are illustrated.

DESCRIPTION OF THE PREFERRED EMBODIMENT

Figure 1:
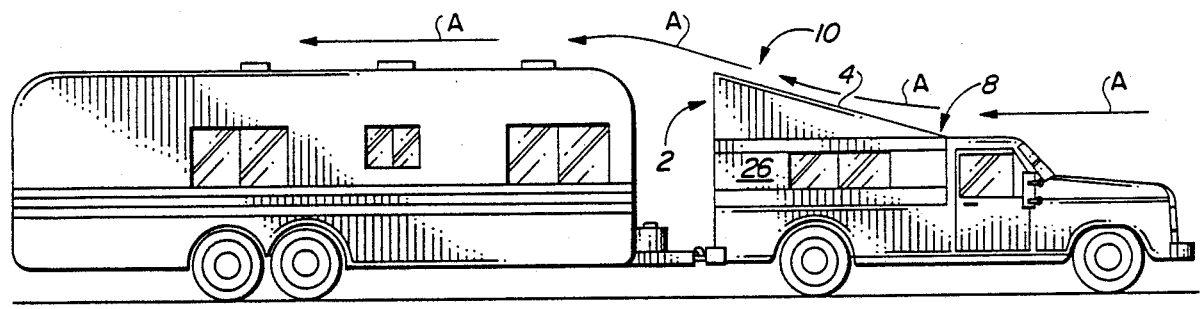
FIG. 1 is a side elevation view of a presently preferred embodiment of this invention as mounted on the bed of a pick up truck, showing its relationship to a towed mobile living unit.

Turning now to FIG. 1 the improved camper shell 2 is illustrated as installed on the bed of a pick up truck which in turn tows a mobile living unit RV. This embodiment has a roof 4 which forms an inclined plane whose lower first end 8 registers substantially with the plane of the roof of the truck T and whose higher second end terminates at a plane registering substantially with the roof of the mobile living unit RV. The structure directs a streamline flow of air from the roof of the cab over the roof 4 of the shell 2 and then over the roof of the towed unit RV, as indicated by arrows A.

Figure 2:
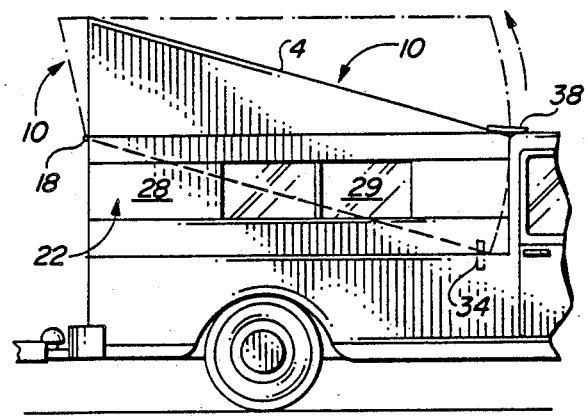
FIG. 2 is a side elevation view of the embodiment of FIGS. 5 and 7 in travelling position, showing in phantom outline the position of the top half when raised to form a habitation.
Figure 5:
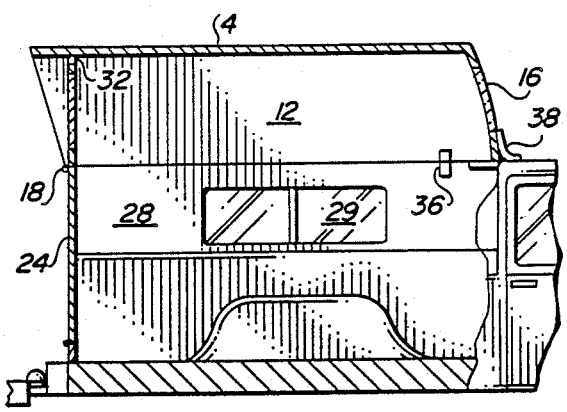
FIG. 5 is a side elevation, in section, of the view of FIG. 7.
Figure 7:
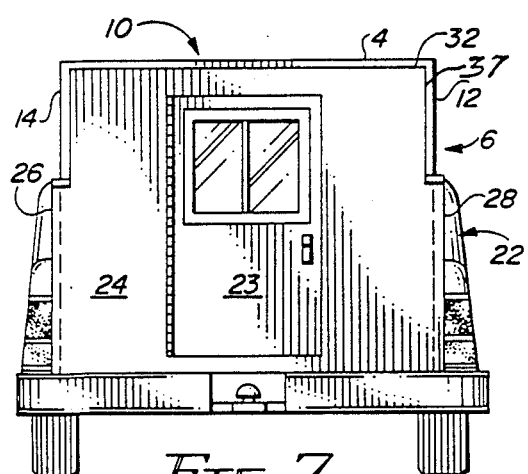
FIG. 7 is a rear elevation view of an alternative preferred embodiment.

As best seen in FIGS. 2, 5 and 7 an optional embodiment of the invention which is convertible provides a top half 6 which has a roof 4, sides 12, 14 and a front wall 16. The second end 10 of the top half 6 is hinged at 18, which provides a pivot point. The bottom half 22 has an end wall 24, with door 23, at the second end, two side walls 26 and 28, with window 27, 29 and no front wall at the first end, although it may be considered that the rear window wall of the cab serves as a front wall. (For ease of illustration, the tailgate is not shown in this embodiment).

The half 6 is dimensioned to telescope within side walls 26, 28 of bottom half 22.

Suitable gaskets 32, 37 are provided for a sliding seal between the roof 4 and side walls 12, 14 of the top half 6 and the end wall 24 of bottom half 22.

A latch 34 is provided to retain the top half 6 in its downward position and a latch 36 is provided to retain the top half in its raised position Also a flexible bridge 38 is provided between the roof of the cab of the truck T and the roof 4 of the top half, which bridge extends the width of the cab roof to cover the aperture between the shell 2 and the cab of the truck T.

Figure 3:
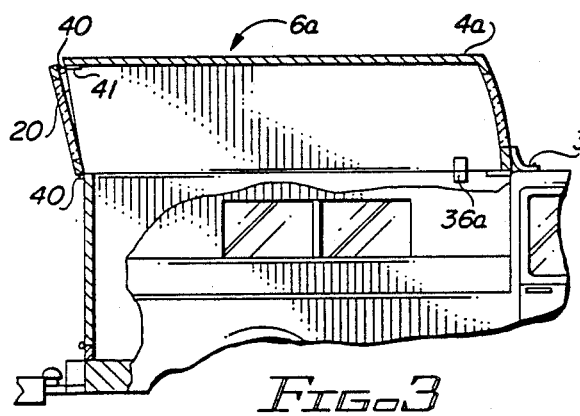
FIG. 3 is a view, in section, taken along the line 3, of the embodiment of FIG. 6, with the top half in raised position.
Figure 4:
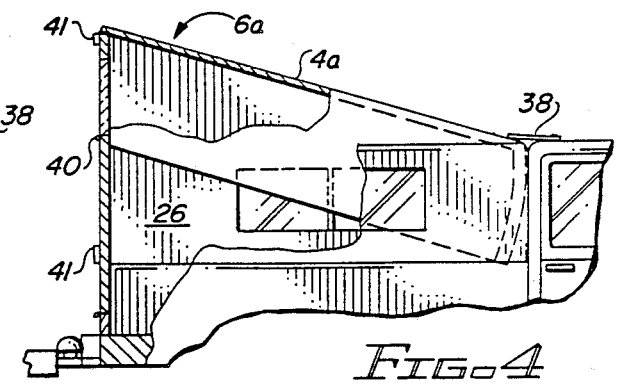
FIG. 4 is a view, in section, taken along line 3, of the embodiment of FIG. 6 with the top half in lowered position.
Figure 6:
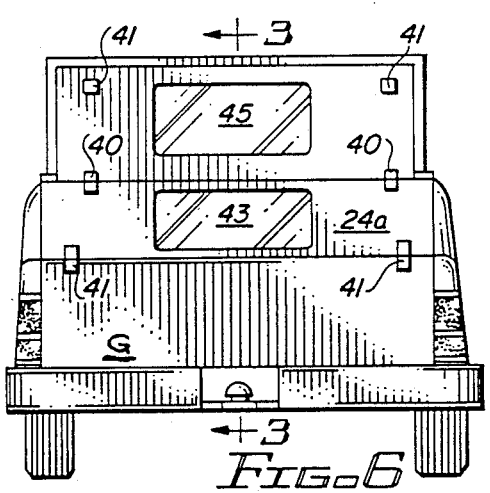
FIG. 6 is a rear elevation view of a preferred embodiment.

FIGS. 6, 3 and 4 illustrate a preferred alternative embodiment in which the tailgate G of the truck forms part of the rear wall of the camper shell in conjunction with an end wall 24a of the bottom half and an end wall of the top half. In this embodiment when the top half 6 is raised to the habitation position, tailgate G may be lowered, and end wall 24a raised pivotally at hinges 40 and latched to end wall 20a by any suitable latch means 41, to provide ingress and egress to the interior of the camping shell. Elements 43, 45 are windows. Otherwise, the structure and operation are essentially the same as in the first described embodiment.

The material of the apparatus may be any suitable metals, wood, fabrics and plastic known to the art.

I claim:

1. Apparatus for streamlining the flow of air from a pick up truck over a mobile living unit being towed by the pick up truck having a truck bed and a tailgate, said apparatus comprising:
   a. means defining a camper shell having a first end and a second end, said shell comprising a roof connecting said first and second ends of said shell, said roof registering substantially with the top of the cab of the truck at said first end and registering substantially with the top of the living unit at said second end;
   b. means in said camper shell defining an end wall having entrance means; and
   c. means for attaching said shell to the bed of the pick up truck.

2. The apparatus of claim 1 wherein said shell further comprises two interacting top and bottom parts adapted to move between first and second operating positions, said first operating position defined by the structure of claim 1 and a second operating position defining an expanded shell wherein said top and bottom parts of said shell are hinged at said second end and said top part is adapted to be raised from said bottom part at said first end to create additional head room at said first end.

3. The apparatus of claim 2 wherein said shell comprises a bottom half comprising two side walls and an end wall extending upwardly of said side walls at said second end, said walls adapted to fit the dimensions of the truck bed, and a top half comprising a first end wall, and two side walls and a roof which closely fit but are not attached to the end wall of said bottom half at said second end, whereby the top half roof and side walls move around said second end wall of said bottom half.

4. The apparatus of claim 1 wherein said end wall at said second end of said shell comprises the tailgate of the truck and an end wall at the second end of said upper part, said end wall being hingedly divided horizontally into upper and lower portions whereby the lower portion of said end wall can be raised in cooperation with lowering said tailgate to provide ingress and egress to and from said shell.

5. The apparatus of claim 2 wherein said end wall at said second end of said shell comprises the tailgate of the truck and an end wall at the second end of said upper part, said end wall being hingedly divided horizontally into upper and lower portions whereby the lower portion of said end wall can be raised in cooperation with lowering said tailgate to provide ingress and egress to and from said shell.

* * * * *